United States Patent
Pullman et al.

[15] 3,696,299
[45] Oct. 3, 1972

[54] RELATIVE CARBON CONTENT METER FOR SMOKE FILTERS

[72] Inventors: James O. Pullman, Chapel Hill, N.C.; William R. Weidlich, St. Joseph, Mich.

[73] Assignee: Liggett & Myers Incorporated, New York, N.Y.

[22] Filed: Feb. 4, 1970

[21] Appl. No.: 8,603

[52] U.S. Cl. .................................. 324/61 R, 331/65
[51] Int. Cl. ............................................ G01r 27/26
[58] Field of Search .......... 324/61, 61 P, 61 B, 61 T1; 331/65

[56] References Cited

UNITED STATES PATENTS

| | | | |
|---|---|---|---|
| 3,090,004 | 5/1963 | Breen et al. | 324/61 |
| 1,932,337 | 10/1933 | Dowling | 324/61 |
| 1,984,166 | 12/1934 | Walter | 324/61 P |
| 3,482,162 | 12/1969 | Wochnowski | 324/61 |
| 3,182,255 | 5/1965 | Hopkins et al. | 324/61 |
| 2,576,489 | 11/1951 | Stovall | 324/61 TI |
| 2,600,928 | 6/1952 | Senm | 324/61 TI |
| 3,739,284 | 3/1956 | Erwin | 324/61 B |

*Primary Examiner*—Alfred E. Smith
*Attorney*—Kenyon & Kenyon Reilly Carr & Chapin

[57] ABSTRACT

An apparatus to measure the relative quantity of carbon present in a smoke filter comprising a parallel plate capacitor between whose parallel plates are disposed rods of filter material. The parallel plate capacitor is attached to a capacitance measuring device which is calibrated to measure a capacitive change of the system comprising said parallel plates and said rods and to indicate when the carbon content of said rods deviates from a predetermined standard. An embodiment of the invention is disclosed which comprises an improved device for measuring the capacitance of said capacitive system by utilizing a linear approximation in the dependency of collector current with small variations in capacitance added to the base circuit in a tuned collector, tuned base transistor oscillator wherein said dependency is measured in a "Wheatstone" bridge circuit.

27 Claims, 10 Drawing Figures

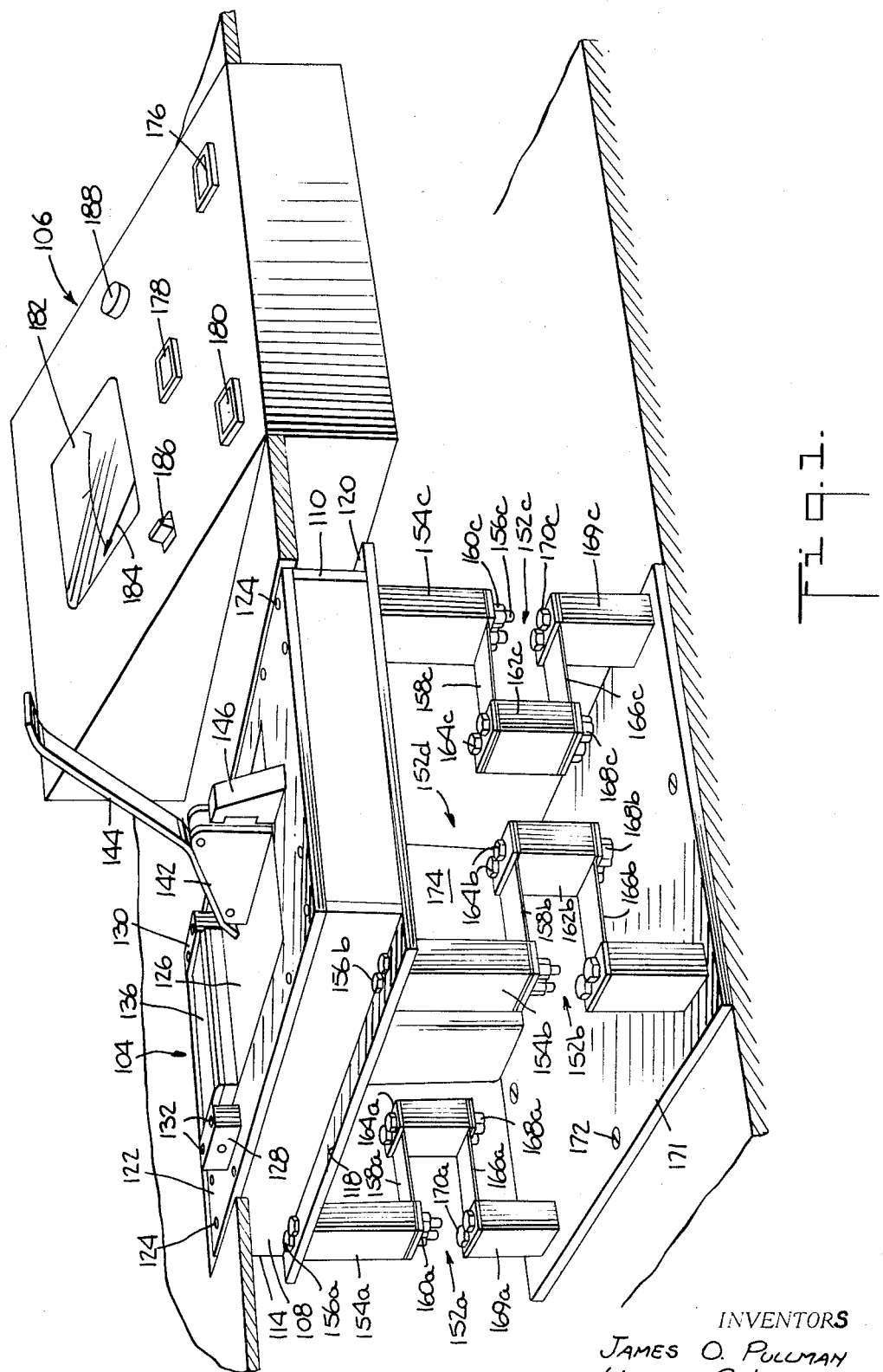

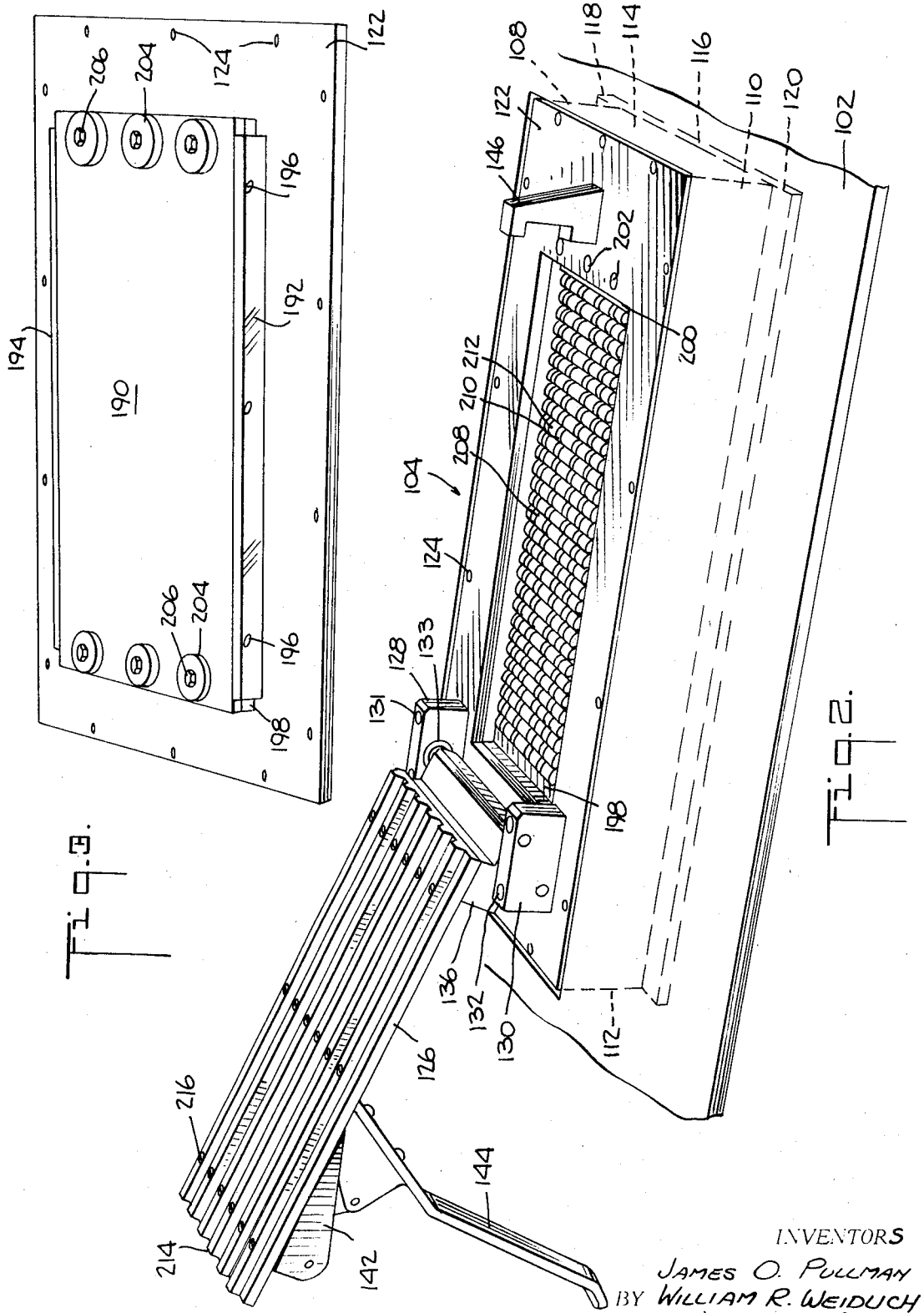

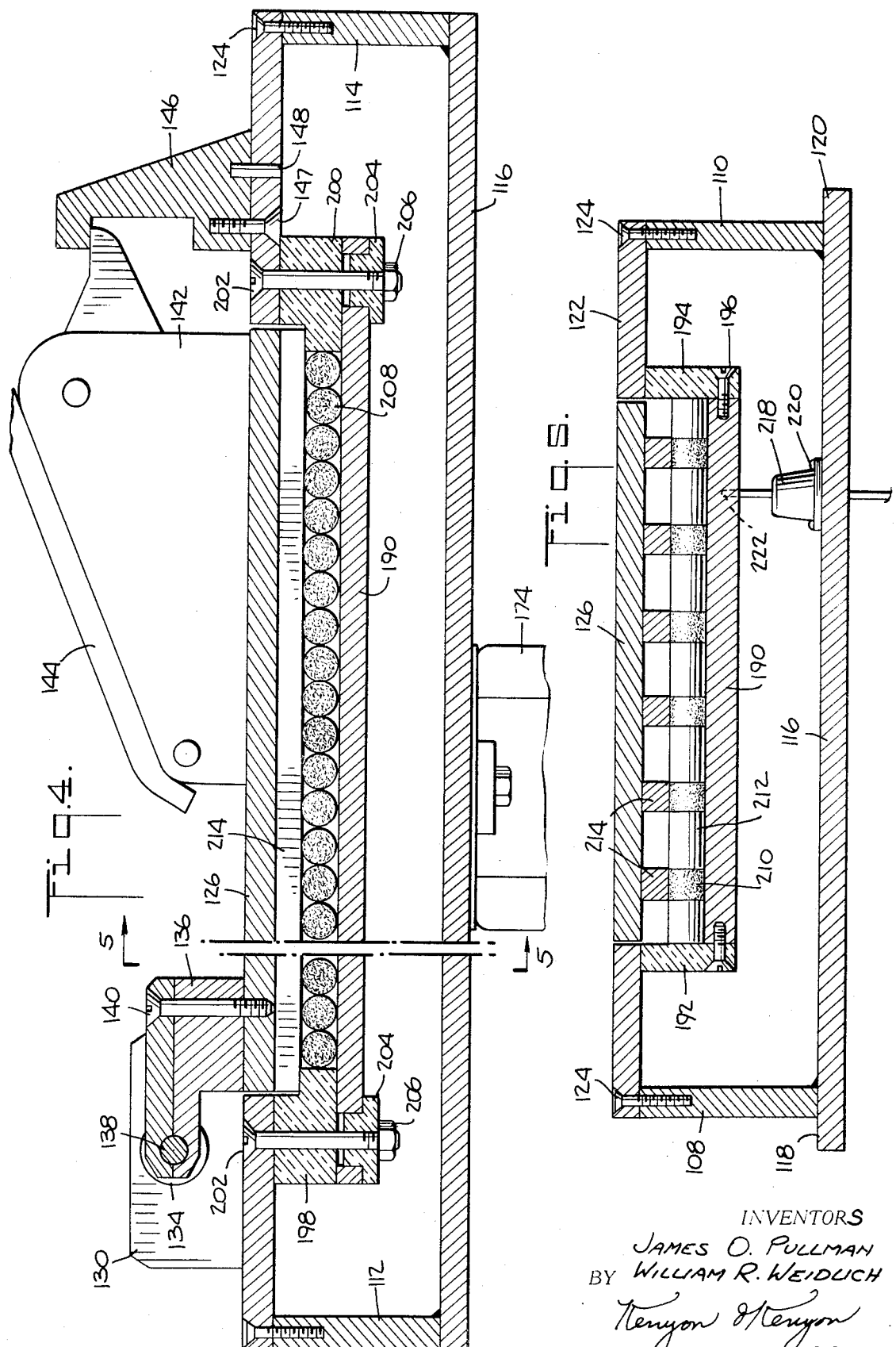

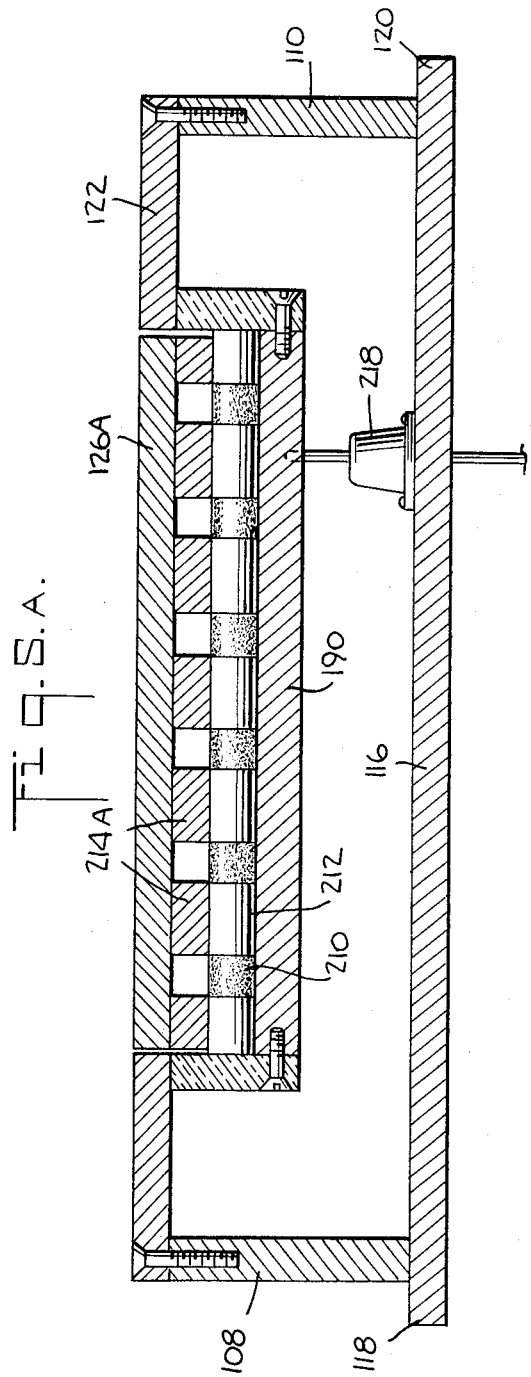

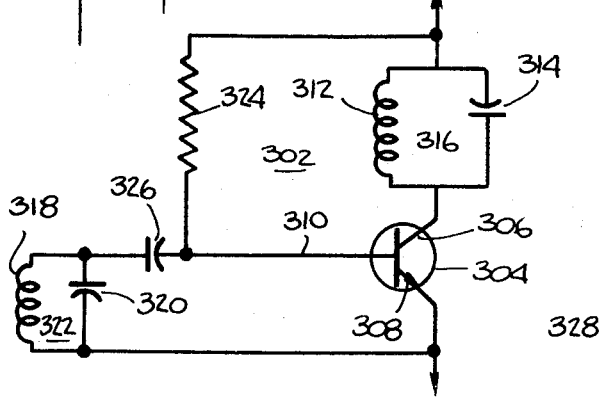
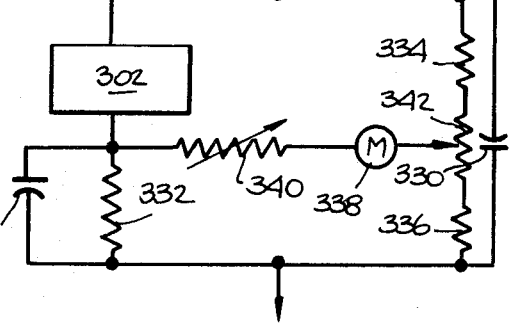
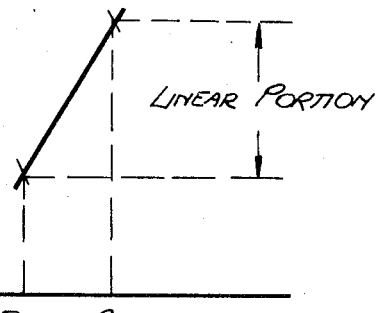
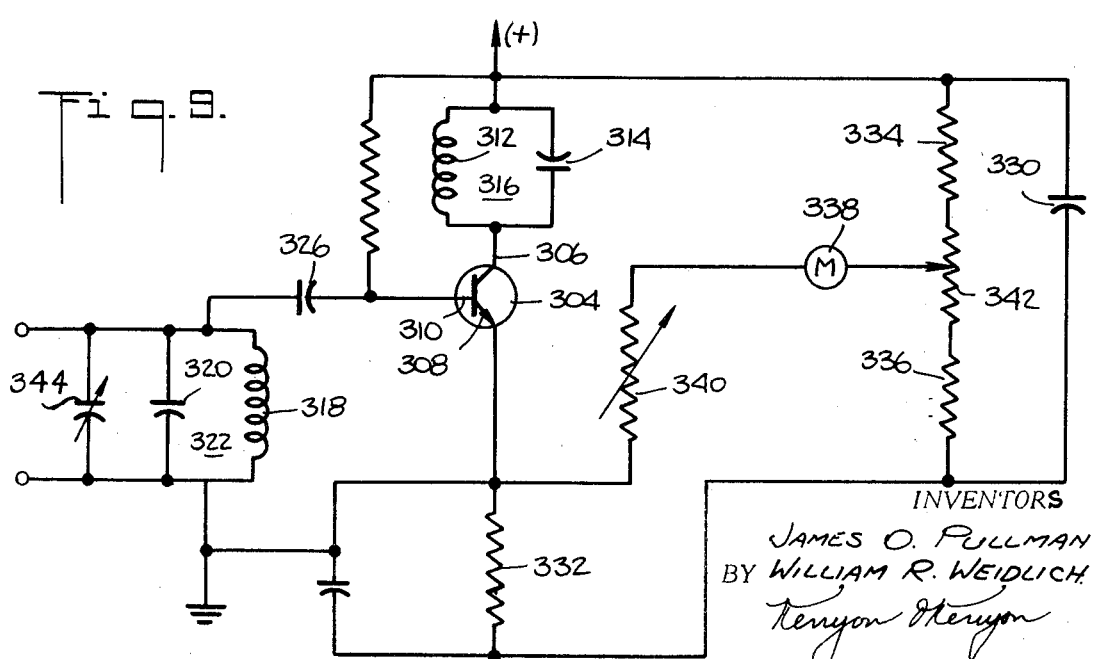

RELATIVE CARBON CONTENT METER FOR SMOKE FILTERS

BACKGROUND OF THE INVENTION

1. Field of the Invention

This invention relates to an apparatus for measuring the carbon content of smoke filters and more specifically relates to an apparatus which measures said carbon content by electronic means and thus non-destructively.

2. Description of the Prior Art

The primary components of conventional cigarette filters typically are plugs composed of paper or cellulose acetate filter tow, plasticizer and wrapping paper. Of these, the tow is susceptible to variations which may seriously effect the filters. To maintain filter quality, it is customary to control the weight of the filter rods which are produced. This will effectively restrict variations in tow weight, and, hence, in pressure drop through the filter, which is a property of the finished cigarette which is of basic importance to the consumer.

Certain smoke filters comprise carbon as well as the above mentioned components. Generally, these filters comprise a carbon-bearing region bounded on at least one end by a non-carbon bearing region. For example, one commercial filter of this kind has a carbon bearing region which consists of a chamber partially filled with activated carbon granules, bounded on each end by a piece of conventional cellulose tow. The manufacture of these filters is more difficult to control because there are now two components, i.e., tow and the carbon, either of which may vary appreciably in weight. In the past, variations in tow and carbon were regulated by a system of control by over-all weight. Occasionally, "tow tests" were made in which the carbon feed was shut off, and the total weight of the non-carbon components was set to within a prescribed range. A specific weight of carbon was then added, and the over-all weight of the tow plus the carbon was then maintained within prescribed limits. Although practicable, this mode of control led to difficulties. The tow tests produced unusable waste and so the number of such tests had to be minimized. Yet, with any reasonable interval between tow tests, changes in the over-all weight of the tow and the carbon were bound to occur. When such changes occurred, it had to be decided whether it was the carbon or whether it was the tow which led to such variation and which one had to be corrected. There was often little basis for choice and, in practice, a variation in one of the components was often miscompensated for by an adjustment to the other. The result was that the over-all filter weight was accurately maintained, but that the individual tow and carbon weights varied widely.

It is of course desirable that the over-all filter weight be maintained, but only within rather broad limits. If cigarettes made with the smoke filters comprising carbon are to appear uniform to the consumer, it is more important to individually control the filters' tow weight, which determines the pressure drop across the filter or what is commonly known as the "draw," and to individually control the carbon content which effects the gas phase removal through the filter and thus effects what is commonly called the "smoothness."

Therefore, a new control system for smoke filters comprising carbon based directly on these consumer related parameters was needed. Techniques have already been developed for measuring the filter pressure drop or the tow weight referred to above. The present invention is directed toward an apparatus which indicates the carbon content of smoke filters in a manner which is non-destructible to said filters.

SUMMARY OF THE INVENTION

This invention measures the relative quantity of carbon present in a smoke filter. This is accomplished by utilizing a parallel plate capacitor and introducing between the plates of said capacitor rods of smoke filters comprising carbon. The introduction of the carbon contained in the rods of smoke filters between the plates of said capacitor will change the capacitance which can be measured between said plates, and the magnitude of the change will depend upon the amount of carbon contained by said filters. Such a system is calibrated by introducing filters containing varying amounts of carbon between the plates of the capacitor and recording the amount of capacitance measured across the parallel plates for each of said filters. Said filters are then disassembled and the carbon content determined directly. A table of carbon content versus capacitance change is then established. Thus a capacitance range corresponding to the range of carbon content of smoke filters which is acceptable for commercial use is specified. Filters which produce a capacitance change outside said specified range will be rejected as having an unacceptable carbon content.

An embodiment of this invention comprises a unique device for measuring the capacitance of a parallel plate capacitor with the smoke filter rods containing carbon disposed therebetween. This device utilizes a linear approximation in the dependency of collector current on small variations in capacitance added to the base circuit in a tuned collector, tuned base transistor oscillator wherein said dependency is measured in a "Wheatstone" bridge circuit.

It is thus an object of the present invention to provide a device which consistently and accurately measures the relative carbon content of smoke filters.

It is a further object of this invention that said measurement of the relative carbon content of smoke filters shall be non-destructible to said filters.

It is a further object of this invention to utilize a device which is relatively simple and economical in operation to measure the capacitance of a system which relates the capacitance of a system with the relative quantity of carbon in the smoke filters to be tested.

This invention can be applied to many different types of smoke filters which comprise carbon in a carbon bearing region bounded on at least one end by a non-carbon bearing region. The greatest difficulties are encountered with filters wherein the carbon-bearing region is a chamber containing loose granules of activated carbon between plugs of conventional cellulose filter material. (This type of filter is hereinafter referred to as "free carbon-type" filters). The specific embodiment of this invention described below is for use with said free carbon-type filters, but it will be understood that other, usually simpler, embodiments of the invention may be used with other types of smoke filters comprising carbon. It is customary to express the carbon content of said free carbon-type filters as "percent fill" of the chambers, referring to the relative volume of the chambers which is occupied by carbon granules, and to refer to the embodiment of the invention used with said free carbon-type filters as a "percent fill meter." Carbon content may equally well be expressed in terms of weight, as would be appropriate with other types of smoke filters comprising carbon.

For a fuller understanding of the nature and objects of the invention, reference should be had to the following detailed description of an embodiment of the invention to test the carbon content in filter rods of the free carbon-type, taken in connection with the accompanying drawings.

BRIEF DESCRIPTION OF THE DRAWINGS

FIG. 1 is a view of the invention illustrating a housing for a parallel plate capacitor with a vibrator attached thereto and mounted on flat leaf springs as well as a housing for capacitance measuring and indicating controls.

FIG. 2 is a partial view of the parallel plate capacitor housing with the upper ridged plate in the open position and showing rods of carbon-type filter material disposed therein.

FIG. 3 is an underside view of the parallel plate capacitor housing showing the bottom side of the lower plate of the parallel plate capacitor.

FIG. 4 is a sectional view of the parallel plate capacitor housing comprised in the present invention.

FIG. 5 is a sectional view of FIG. 4 taken along the line 5—5 in FIG. 4 in the direction of the arrows.

FIG. 5a is a sectional view of an alternate embodiment of the invention.

FIG. 6 is a schematic view of a tuned base, tuned collector transistor oscillator circuit used in an embodiment of the invention.

FIG. 7 is a schematic view of a Wheatstone bridge circuit with the circuit of FIG. 6 incorporated therein.

FIG. 8 is a graph illustrating the operation of a portion of an embodiment of the invention.

FIG. 9 is a schematic view of an embodiment of the circuit illustrated in FIG. 7.

DETAILED DESCRIPTION

Referring now to the drawings, and to FIG. 1 in particular, a preferred embodiment of the invention is shown as a parallel plate capacitor adapted to receive rods of free carbon-type filters to be tested and connected to a measuring and indicating device which measures the capacitance of the parallel plate capacitor with the rods disposed therein and indicates this capacitance.

A test station 102 generally comprised of wood, but which may be constructed from any suitable construction material, houses a parallel plate capacitor housing designated generally by 104 and a capacitance measuring and indicating control housing 106. The parallel plate capacitor housing 104 comprises side walls 108 and 110 and end walls 112 and 114. In the preferred form of the invention shown in the drawings, side walls 108 and 110 and end walls 112 and 114 are comprised of a metallic material and are fastened together by welding, internal to the housing 104. A base portion 116 of housing 104 is also comprised of a metallic material which is fastened to the side walls 108 and 110 and the end walls 112 and 114 by means of welding internal to housing 104. Base 116 has lip portions 118 and 120 which extend beyond the side walls 108 and 110. A face plate 122 comprises the top portion of housing 104. Face plate 122 is also comprised of a metallic material which is attached to side walls 108 and 110 and end walls 112 and 114 by means of metal screws 124.

An upper capacitor plate 126 of the parallel plate capacitor housed in housing 104 is rotatably mounted on the face plate 122 of housing 104. Bearing housings 128 and 130 are mounted on face plate 122 by means of metal screws 131 and 132, respectively. Precision shaft and instrument bearings 133 and 134 are respectively housed in bearing housings 128 and 130. Block 136 is rotatably mounted in bearings 133 and 134 by means of a shaft 138. Furthermore, block 136 is attached to capacitor plate 126 by means of screws 140 (FIG. 4). A toggle clamp type of latch 142 is mounted on capacitor plate 126. The latch 142 has a handle 144 which actuates the latch into and out of engagement with a stationary lug 146 which is mounted by means of a metal screw 147 and a pin 148 on face plate 122 of housing 104 (FIG. 4).

Thus, it may be seen that the upper capacitor plate 126 of the parallel plate capacitor housed in housing 104 is rotatably mounted in the face plate 122 of housing 104 so that when said capacitor plate 126 is in the closed position (as shown in FIG. 1 and FIG. 4) the latch 142 engages the lug 146 and the upper surface of plate 126 is contiguous with the upper surface of plate 122 of housing 104.

Housing 104 is mounted to a fixed portion 150 of test stand 102 by four spring supports designated generally at 152a, 152b, 152c, and 152d (FIG. 1, 152d not shown), each distending from a corner of base 116 of housing 104. Each spring support 152a–d comprises a spacer block 154a–d of wood or any other suitable material which is attached at one end to the corners of base 116 of housing 104 by means of bolts 156a–d. Leaf springs 158a–d are attached at one end to the other end of spacer blocks 154a–d by means of bolts 156a–d and nuts 160a–d. The other ends of leaf springs 158a–d are attached at their other ends to one end of spacer blocks 162a–d by means of bolts 164a–d. Leaf springs 166a–d are attached at one end to the other ends of spacers 162a–d by means of bolts 164a–d and nuts 168a–d. The other ends of leaf spring 166a–d are attached to one end of spacers 169a–d by means of bolts 170a–d. Spacers 169a–d are connected at their other end to a base plate 171 by bolts 170a–d and by recessed nuts on the underside of plate 171 (not shown). Plate 171 is fastened to the stationary portion 150 of test stand 102 by means of fasteners 172.

For purposes hereinbelow described, a vibrator 174 is attached to the underside of base plate 116 of housing 104. The vibrator used in a preferred embodiment of the present invention is a commercial vibrator manufactured by the Syntron Company and known as Syntron vibrator model V4AC. It is to be noted that any form of spring supports 152a–d could be used with the invention, for example, flexible rubber spring supports can also be used.

Housing 106 houses capacitance measuring and indicating circuits which are described hereinbelow in connection with FIGS. 6–9. These circuits measure and indicate the capacitance of the parallel plate capacitor which is mounted in housing 104. The housing 106 has provisions for a power-on switch 176 which controls the AC power. A switch 178 is the "mode switch" which can be pressed to place the instrument in the "-calibrate mode" for the purposes of verifying the calibration of the instrument. The mode switch 178 can be pressed again to place the instrument in the "operate mode" which is the mode used for the actual testing or measurements of the carbon content of the free carbon-type filters to be tested. Switch 180 is the "cycle switch" which starts the automatic operating cycle described hereinbelow. Meter 182 indicates the percent deviation of the carbon content of the carbon-type filter material to be tested from a prescribed zero percent fill condition. Needle 184 indicates the percentage of deviation from this standard. Lever switch 186 places the operation of the meter 182 to the right or to the left of the zero percent deviation condition. Knob 188 is the zero control knob and is used to place the needle 184 at the zero percent deviation position on the meter 182 when the instrument is in the "-calibrate mode."

FIG. 2 is a partial view of the parallel plate capacitor housing 104 with the upper ridged plate 126 in the open position. FIG. 3 shows the underside of covering plate 122 of housing 104. Referring to FIG. 3, the bottom capacitor plate 190 of the parallel plate capacitor housed in housing 104 forms the base of a compartment which has side walls 192 and 194 comprised of an insulating material which are attached to said capacitor plate 190 by means of fasteners 196, and end wall spacers 198 and 200 which are comprised of an insulating material and are attached at one end to face plate 122 of housing 104 by means of bolts 202 and to the ends of capacitor plate 190 by means of bolts 202, insulating washers 204 and nuts 206. (See also FIGS. 4 and 5).

Referring to FIG. 2, thirty rods 208 of free carbon-type filters to be tested are shown disposed on top of capacitor plate 190 in the compartment described hereinabove in relation to FIG. 3. A portion of insulating spacers 198 and 200 are just higher than the rods of free carbon-type material 208. Each rod 208 of free carbon-type filter to be tested comprises alternating charcoal chambers 210 and cellulose filter segments 212. Each rod will ultimately yield six free carbon-type filters, with each filter comprising a single carbon bearing region which for the present description is charcoal chamber 210 bounded at each end by a non-carbon bearing region 212. The upper capacitor plate 126 comprises ridges 214 attached to a surface of capacitor plate 126 by means of fasteners 216. Ridges 214 are so positioned on capacitor plate 126, with respect to each other, that when said capacitor plate 126 is locked into the closed position by latch 142 and lug 146, the ridges 214 are supported at their ends by insulating spacers 198 and 200 and are adjacent the charcoal chambers 210 of the free carbon-type filter rods 208 when said free carbon-type filter rods are disposed on the lower capacitor plate 190 (See FIGS. 4 and 5). Although the ridges 214 are not necessary to the invention they are preferred for the presently described embodiment for reasons hereinbelow explained.

FIGS. 4 and 5 show the upper capacitor plate 126 locked into the closed position by latch 142 and lug 146. The rods 208 of free carbon-type filters to be tested are shown sandwiched on top of the lower capacitor plate 190 between a portion of the insulating spacers 198 and 200. The ridges 214 of the upper capacitor plate 126 are supported at their ends by a portion of the insulating spacers 198 and 200 and are adjacent the carbon chambers 210 of the rods 208. It may be noted that when the upper capacitor plate 126 is locked into the closed position by latch 142 and lug 146 it forms an integral closure with the housing 104, thus completely enclosing the lower capacitor plate 190. This shielding of the lower capacitor plate 190 protects it from the proximity effects of nearby objects and personnel and furthermore shields any RF radiation from this "hot" plate. Power is provided to the lower capacitor plate 190 via electrical plug 218. The electrical plug 218 is shown in FIG. 5 as a radio frequency coaxial connector which is mounted on base plate 120 of housing 104 by screws 220 and is attached electrically to the lower capacitor plate 190 at the point 222.

FIG. 5a shows an alternate form of the invention which utilizes, in addition to the upper capacitor plate 126, an upper capacitor plate 126a. The alternate upper capacitor plate 126a has ridges 214a which adjoin the non-carbon regions 212 of the free carbon-type filter rods 208 when said alternate plate 126a is in the closed position as shown in FIG. 5a. The operation of this alternate form of the invention is described hereinbelow, but it is to be noted that the alternate upper capacitor plate 126 (with ridges adjacent the carbon chambers) and the upper capacitor plate 126a (with ridges adjacent the non-carbon regions) can be hinged at opposite ends of the parallel plate capacitor housing 104 to be clamped over the filter rods 208 one at a time. An alternate construction to accomplish the use of alternate upper capacitor plates 126 and 126a is to use a single ridged upper capacitor plate which could be offset along the filters by a fixed amount necessary to shift the ridges of said upper capacitor plate from a position adjacent the carbon chambers 210 of the rods 208 to a position adjacent the non-carbon regions 212 of the rods 208. Furthermore, a more advanced version of the invention using the alternate upper capacitor plates might combine both arrays of ridges in a single plate and the conversion of the signals from the two arrays to a single, compensated reading could be done electronically.

When the free carbon-type filter rods 208 are loaded onto the lower capacitor plate 190 between the insulated spacers 198 and 200 and the upper capacitor plate 126 is locked into position by latch 142 and lug 146, the carbon within the carbon chambers 210 is generally in a state of disarray. Often, for example, the rods 208 will roll just prior to reaching their final positions, leaving the carbon surface of the carbon within carbon chamber 210 at an angle to the surface of the lower capacitor plate 190, adjacent said rods, or to the surface of the ridges 214, adjacent said rods. This angle will vary from time to time and readings obtained from successive measurements of a given sample of free carbon-type filter rods 208 will therefore vary accordingly. Since accuracy and consistency are objects of this invention it is necessary that the carbon array not vary appreciably from measurement to measurement. This is accomplished by attaching a vibrator 174 to the housing 104 and providing flexible mounts 152a–d to support the insulating frame 104 in the test station 102 (See FIGS. 1 and 4). The vibration of the frame 104 prior to each measurement assists in maintaining a constant carbon array from measurement to measurement.

OPERATION OF THE INVENTION

The capacitance of an electrical capacitor such as the parallel plate capacitor comprised of capacitor plates 126 and 190 is proportional to the area of the plates, and inversely proportional to the distance, D, between them. If an irregular conductive object were placed between the plates, the plate spacing would effectively be reduced and the capacitance measured across the plates would increase. If the object's shape is complicated, it may be difficult or impossible to calculate the expected capacitance change across the plates of the capacitor as the object is introduced between the plates. Nevertheless, if several such objects of similar shape but variable size are successively introduced between the plates of the capacitor, the change in capacitance across the plates of the capacitor as each object is introduced and then withdrawn will relate to the object size in each case. The carbon in carbon chamber 210 of free carbon-type filter rods 208 is effectively a small conductive object. If the carbon chamber 210 has a substantially constant length and cross section, changes in the carbon percent fill will be reflected in changes of carbon height. Thus if we place the free carbon-type filter rods 208 between the plates 126 and 190 of the parallel plate capacitor, the capacitance change measured across the plates 126 and 190 by the capacitance indicating means described hereinbelow will be proportional to the carbon content of the batch of free carbon-type filters being measured.

There are three possible orientations of the free carbon-type filter rods 208 and the capacitor plates 126 and 190. The capacitor plates 126 and 190 could be placed vertically with respect to a horizon line and the rods 208 parallel to said line. With this arrangement of the plates 126 and 190 and the rods 208, the maximum sensitivity occurs when the carbon chambers 210 are about half full. Another orientation is when the plates 126 and 190 and the rods 208 are all placed vertically with respect to a horizon line. With this arrangement of the plates 126 and 190 and the rods 208, the response is linear at all carbon levels, but the response is only moderate. For the embodiment of the invention illustrated in the drawing the third orientation is used where the plates 126 and 190 and the rods 208 are all parallel to the horizon line. This orientation gives rapidly increasing sensitivity for filters which are substantially more than half full. That orientation is chosen which is best suited for the free carbon-type filters 208 to be measured.

In operation, the power-on switch 176 is put into the "on" position. The "mode switch" 178 is depressed to put the instrument in the "calibrate mode." The meter 182 should read zero (center scale) and if it does not the meter should be adjusted by use of knob 188 to place the needle at the zero position. Furthermore, while the instrument is in the "calibrate mode" the lever switch 186 pressed to the right or to the left should result in a meter reading which is between pairs of fiducial marks to the right or to the left, respectively, of the ends of the meter readings of meter 182. Next, the "mode switch" 178 should be depressed to place the instrument in the "operate mode." A sample batch of free carbon-type filter rods 208 is then loaded onto the parallel plate capacitor 190 as shown in FIG. 2. The upper capacitor plate 126 is then locked in place by latch 142 and lug 146 as shown in FIG. 4. The "cycle switch" 180 is then depressed to start the automatic operating cycle which is controlled by a cam timer (not shown). The vibrator 174 will then vibrate the housing 104 for a short period of time, e.g., 5 seconds, settling the carbon in the carbon chambers 210 of the rods 208. The vibrator 174 is then automatically turned off and the indicating meter 182 is connected for a short period of time, e.g., 5 seconds, during which time a reading is observed. At the end of this 10 second cycle, the meter is again disconnected. The latch 142 is then disengaged from lug 146 and the upper capacitor plate 126 is placed in the open position.

As an illustration of its operation, this form of the invention was adjusted to provide a zero deviation (center scale) reading for filters with chambers filled with carbon granules to the extent of 63 percent. Groups of filter rods, each group having a different carbon content, were then prepared. A reading of the above-described instrument was then obtained for each group. Then the filters were cut open and the true carbon content determined directly. Typical results were as follows:

| Average relative carbon content of filters, percent filled | Meter reading, percent fill deviation from 63% full |
|---|---|
| 60.2 | −2.7 |
| 61.3 | −0.9 |
| 61.7 | −0.8 |
| 62.4 | −0.8 |
| 62.4 | 0.0 |
| 62.8 | −0.1 |
| 62.6 | 0.5 |
| 62.9 | 0.3 |
| 63.4 | 0.1 |
| 64.1 | 0.3 |
| 63.5 | 0.7 |
| 64.6 | 0.6 |
| 65.4 | 2.3 |
| 65.9 | 2.6 |
| 65.6 | 3.3 |
| 67.1 | 4.7 |
| 67.4 | 4.3 |
| 67.6 | 4.6 |
| 68.1 | 4.5 |
| 67.9 | 5.6 |

When the above data are plotted, all points are within one percent fill of an average line.

It is to be noted that the above description of the operation of this invention describes a specific use of the invention and that the scope of the invention is not so limited. Furthermore, in the form of the invention shown in FIGS. 2, 4 and 5, the upper capacitor plate 126 comprises ridges 214. As mentioned above, although the invention may comprise an upper capacitor plate 126 which has no ridges, the preferred form of the invention comprises ridges 214. The ridges 214 are used on the upper capacitor plate 126 to aid in eliminating the response of the parallel plate capacitor to moisture variations in the non-carbon portions 212 of the free carbon-type filter rods 208. Since the ridges 214 of the upper capacitor plate 126 adjoin the carbon chambers 210, as shown in FIG. 5, the effect of the non-carbon regions 212 is made less by widening the spacing between the upper capacitor plate 126 and the lower capacitor plate 190 in those regions. A further reduction may be accomplished with an alternate construction of the lower capacitor plate which has ridges adjoining the carbon chambers 210. Alternately, the invention can comprise in addition to the upper capacitor plate 126 which has ridges which adjoin the carbon chambers 210 when said plate is in the closed position, a second upper capacitor plate 126a which has ridges which adjoin the non-carbon regions 212 when said second plate is in the closed position as shown in FIG. 5a. The plate 126 is very sensitive to the carbon in the free carbon-type filter rods 208, but also responds somewhat to the non-carbon materials in said rods. The plate 126a, on the other hand, has a minimum response to the carbon in the carbon chambers 210, and has a maximum response to the non-carbon regions 212. Thus, the capacitance across the parallel plate capacitor is measured for a given batch of free carbon-type filter rods 208 when the upper capacitor plate 126 is closed and again when the upper capacitor plate 126a is closed. These two readings of capacitance, called $R_1$ and $R_2$, respectively, are then combined to form a reading $R = R_1 - KR_2$, which is independent of moisture. $R_1$ is the reading of capacitance with the upper capacitor plate 126 closed. $R_2$ is the reading of capacitance with the upper capacitor plate 126a closed. $K$ is a constant which is determined empirically to cause the combination $R_1 - KR_2$ to be moisture independent. This alternate use of two upper capacitor plates has a small loss in carbon sensitivity over the use of only the single upper plate 126, but the accuracy of the response to carbon is measurably increased.

Although the above description of the preferred form of the invention was in connection with the measurement of the carbon content of rods of free carbon-type filters comprising alternating carbon chambers and non-carbon regions, the present invention could also be used to determine the carbon content of filters of the "carbon-impregnated acetate" type in which the carbon bearing regions are carbon granules dispersed in a rod of cellulose acetate filter material. For this measurement the vibrator 174 is not necessary and the upper capacitor plate 126 might be flat and not have the ridges 214.

Further the orientation of the capacitor plates and filter rods would have no effect on the response of the instrument to carbon and would be a matter of convenience only. When the parallel plate capacitor device of the invention as shown in FIGS. 1–5 was used with a modified form of the meter 182 to measure the carbon content of "carbon-impregnated acetate" type filters in which no plasticizer was used and in which the carbon was 14 × 40 mesh, typical results were as follows:

| Sample | Carbon Content (gm/100 rods) | Carbon Meter Reading |
|---|---|---|
| 1 | 0 | 37.5 |
| 2 | 0 | 38.0 |
| 3 | 33.1 | 94.5 |
| 4 | 33.4 | 94.0 |
| 5 | 12.50 | 56.5 |
| 6 | 14.05 | 58.5 |
| 7 | 57.5 | 142 |
| 8 | 57.1 | 140 |

When the above data are plotted, all points lie within 1.0 gm/100 rods of an average, almost linear curve.

As mentioned above, the housing 106 houses a capacitance indicator means which measures the capacitance of the parallel plate capacitor comprising capacitor plates 126 and 190. This capacitance indicator means may be any device connected across the plates 126 and 190 of the parallel plate capacitor which will respond to capacitance changes as small as one-tenth picofarad. Such a capacitance indicator means which is comprised in a preferred embodiment of this invention is illustrated in FIGS. 6–9.

FIG. 6 shows a tuned collector, tuned base transistor oscillator (hereinbelow referred to as a T.C.T.B. oscillator) designated generally at 302 for use in the capacitance indicator means which is comprised in an embodiment of the present invention. The T.C.T.B. oscillator 302 is of standard design and comprises a transistor 304 which in a preferred embodiment of the present invention is a 2N2925 transistor manufactured by General Electric Co. The transistor 304 comprises a collector 306, an emitter 308 and a base 310. An inductance 312 connected in parallel with a capacitance 314 comprise the collector tuned circuit, designated generally at 316, of the T.C.T.B. oscillator 302. An inductance 318 connected in parallel with a capacitance 320 comprise the base tuned circuit, designated generally at 322, of the T.C.T.B. oscillator 302. A resistor 324 connecting the collector tuned circuit 316 to the base 310 of transistor 304 comprises the base bias resistor. A capacitance 326 connecting the base tuned circuit 322 to the base 310 of transistor 304 comprises the base coupling capacitor.

The collector inductance 312 and the base inductance 318 are electromagnetically coupled by virtue of their proximity.

The base tuned circuit 322 of T.C.T.B. oscillator 302 has nearly the same resonant frequency as the collector tuned circuit 316 of T.C.T.B. oscillator 302. As the base tuned circuit 322 is adjusted away from this mutually resonant point by adding capacitance to capacitance 320, the current of collector 306 of transistor 304 changes in an essentially S-shaped manner as a function of capacitance added to capacitance 320.

FIG. 8 is a graph of the relative collector 306 current as a function of capacitance added to capacitance 320 in base tuned circuit 322. In the central portion of the S-shaped curve of FIG. 8 the relative collector 306 current is approximately linear with respect to small variations of capacitance 320 in the base tuned circuit 322. In other words, in this linear region of operation of the T.C.T.B. oscillator 302 with respect to relative collector 306 current as a function of capacitance added to capacitance 320, any change in the capacitance 320 within the linear range will result in a change of relative collector 306 current which is proportional to the change in capacitance 320. This relationship may be expressed as follows:

$\Delta I_c = K_c \Delta C_b$, where $\Delta I_c$ is a change in relative collector 306 current, $\Delta C_b$ is a change in capacitance 320 and $K_c$ is a proportionality constant with respect to capacitance. Thus the T.C.T.B. oscillator 302, within the above described linear range of operation, acts as a current source which produces a current (collector 306 current) which increases in proportion to an unknown capacitance added to the base tuned circuit 322.

It can be demonstrated experimentally that the departures from linearity are small if an accurately calibrated variable capacitor, General Radio Co. type 722-S54, for example, is connected in parallel with the base tuned circuit 322. This was done with an embodiment of the circuit herein described. Said circuit was adjusted so that a full scale deflection of meter 338 corresponded to a capacitance change of 10.00 picofarads. Known capacitance changes were then compared with meter 338 indications as follows:

| (a) True change in capacitance, picofarads | (b) Capacitance change indicated by meter, linear scale | Error (b) − (a) |
| --- | --- | --- |
| 0.00 | 0.00 | 0.00 |
| 1.00 | 0.95 | −0.05 |
| 2.00 | 1.98 | −0.02 |
| 3.00 | 2.99 | −0.01 |
| 4.00 | 3.96 | −0.04 |
| 5.00 | 4.96 | −0.04 |
| 6.00 | 5.96 | −0.04 |
| 7.00 | 6.97 | −0.03 |
| 8.00 | 8.00 | 0.00 |
| 9.00 | 9.01 | 0.01 |
| 10.00 | 10.00 | 0.00 |

The average error is less than 1 percent, only part of which is ascribable to non-linearity.

It is to be noted that collector 306 current is also proportional to an unknown inductance added to the base tuned circuit 322 when the T.C.T.B. oscillator 302 is within the linear range of operation with respect to relative collector 306 current as a function of inductance added to inductance 318 in base tuned circuit 322. This relationship may be expressed as follows:

$\Delta I_c = K_i \Delta L_b$, where $\Delta I_c$ is a change in relative collector 306 current, $\Delta L_b$ is a change in inductance 318 and $K_i$ is a proportionality constant with respect to inductance.

Thus, the T.C.T.B. oscillator 302 can be utilized to measure an unknown inductance or capacitance which is added to the base tuned circuit 322 by determining the appropriate proportionality constant $K_c$ or $K_i$ and by measuring the resultant change in collector 306 current.

FIG. 7 and FIG. 9 show the T.C.T.B. oscillator 302 connected in a Wheatstone bridge circuit. The Wheatstone bridge circuit of FIGS. 7 and 9 is of generally standard design and comprises R.F. bypass capacitors 328 and 330. The Wheatstone bridge circuit further comprises bridge resistors 332, 334 and 336. A meter 338 measures the bridge unbalance voltage and a potentiometer 340 is used to adjust the meter sensitivity. The meter 338 comprised in a preferred embodiment of the present invention is a product of Assembly Products Inc. Model 502 which has a 100 microampere range. A potentiometer 342 is used as a "zero" adjust for the meter 338.

As described hereinabove, the T.C.T.B. oscillator 302 acts as a current source, developing a voltage across bridge resistor 332.

In a preferred embodiment of the present invention used in practice, the capacitance indicator means comprised in the present invention is adapted to indicate changes of from zero to ten picofarads on the meter scale of meter 338. Alternately, a decading switch can be added to switch capacitance out of the circuit in successive increments of 10 picofarads each. This allows the capacitance indicator means to measure changes of up to approximately 100 picofarads, with the component values listed below, while still retaining the accuracy and resolution of the ten picofarad device.

In its application as a ten picofarad device the capacitance indicator means of this invention comprises a variable capacitance 344 in parallel with capacitance 320 of the base tuned circuit 322. The variable capacitance 344 is set for a zero meter current reading on meter 338 with no external capacitance added to the base tuned circuit 322, and potentiometer 340 is adjusted for meter full-scale current on meter 338 when a 10 picofarad capacitance is added to the base tuned circuit 322 in parallel with capacitance 320 and 344. In a preferred embodiment of the present invention measuring zero to 10 picofarads on the meter scale of meter 338, the transistor 304 is arbitrarily chosen to be a transistor manufactured by the General Electric Co. and designated by the General Electric Co. as 2N2925. As described hereinabove, the transistor 304 is incorporated into the T.C.T.B. oscillator 302. The collector tuned circuit 316 and the base tuned circuit 320 are selected so that the transistor 304 will operate in the central portion of the S-shaped curve of FIG. 8. Thus, the inductance 312 is chosen to be approximately 8.2 microhenries, a capacitance 314 is chosen to be approximately 220 picofarads, an inductance 318 is chosen to be approximately 8.2 microhenries and the capacitance 320 is chosen to be approximately 40 picofarads. In addition, the base bias resistor 324 is chosen to be approximately 560 K and the base coupling capacitor 326 is chosen to be approximately 0.01 microfarads. Furthermore, the variable capacitance 344 which aids in tuning the base tuned circuit 322 is chosen to vary over a range approximately 1–12 picofarads.

As described hereinabove, the collector 306 current of the transistor 304 is measured in a Wheatstone bridge circuit. For the choice of values of the components of the T.C.T.B. oscillator 302 given above, the bridge resistors 332, 334 and 336 are chosen to be 2.4 K. The potentiometer 340 is chosen to have approximately a 5 K span and the potentiometer 342 is chosen to have approximately a 100 ohm span. The two R.F. bypass capacitors 328 and 330 are chosen to have approximately 0.05 and 0.01 microfarads, respectively.

The foregoing description in conjunction with the drawing is considered illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. Apparatus for measuring the quantity of carbon in smoke filters having carbon-bearing and non-carbon-bearing portions, said apparatus comprising:

a. first and second electrodes disposable in a spaced facing relation to each other to accommodate placement of the filters in a pattern therebetween, said first electrode having conductive protrusions on one surface thereof extending toward said second electrode adjacent the carbon-bearing regions of the filters for establishing in the space between said electrodes an electric field when an electric potential difference is applied between said electrodes, said electric field being relatively concentrated in the regions of the carbon-bearing portions of the filters with respect to the concentration of said field in said non-carbon-bearing portions of said filters and being directed primarily perpendicular to said electrodes; and b. means electrically connectable to said first and second electrodes for measuring the electrical capacitance between said electrodes.

2. The apparatus of claim 1, in which: said first and second electrodes comprise parallel conductive plates having a substantially flat configuration.

3. The apparatus of claim 2, further comprising: means for maintaining filters having rod configuration in a pattern of parallel adjacency with the carbon-bearing regions of the filters respectively aligned adjacent one another.

4. The apparatus of claim 3, in which said protrusions comprise conductive parallel ridges, said ridges positioned to be disposed adjacent said aligned carbon-bearing portions of the filter rods when said first and second electrodes are disposed in said spaced facing relationship.

5. The apparatus of claim 4, further comprising an additional electrode electrically connectable to said measuring means and said second electrode and having conductive protrusions on one surface thereof and being disposable in a spaced facing relationship with said second electrode, with said protrusions of said additional electrode extending toward said second electrode, in the regions of said filter rods which are non-carbon-bearing.

6. The apparatus of claim 5, in which said protrusions on said additional electrode comprise conductive parallel ridges.

7. The apparatus of claim 2, having means for holding the filters in said pattern, said means comprising:
a. a pair of non-conductive side walls disposed adjacent opposite sides of said first and second electrodes; and
b. a non-conductive end wall disposed adjacent one end of said electrodes, whereby said side walls and said end wall cooperate in forming a frame to maintain the filters disposed in said pattern.

8. The apparatus of claim 1, further comprising: means for maintaining filters having rod configuration in a pattern of parallel adjacency with the carbon-bearing portions of the filters respectively aligned adjacent one another.

9. The apparatus of claim 8, having means for holding the filter rods in said pattern, said means comprising:
a. a pair of non-conductive side walls disposed adjacent opposite sides of said first and second electrodes; and
b. a non-conductive end wall disposed adjacent one end of said first and second electrodes, whereby said side walls and said end wall cooperate in forming a frame to maintain the filter rods in said pattern.

10. The apparatus of claim 8, further comprising:
a vibrator to vibrate the filter rods when the rods are disposed in said pattern, whereby the carbon in the carbon-bearing portions of the filter rods is settled by means of the vibrations created by said vibrator.

11. The apparatus of claim 1, further comprising: hinge means for hingedly mounting one of said first and second electrodes adjacent the other of said first and second electrodes, whereby said one of said first and second electrodes may be selectively rotated into and out of said spaced facing relation with said other of said first and second electrodes.

12. The apparatus of claim 11, further comprising: fastening means attached to at least one of said first and second electrodes for locking said one of said first and second electrodes in said spaced facing relationship with the said other of said first and second electrodes.

13. The apparatus of claim 1, wherein said protrusions comprise conductive parallel spaced ridges.

14. The apparatus of claim 13, further comprising an additional electrode electrically connectable to said measuring means and said second electrode and having conductive protrusions on one surface thereof and being disposable in a spaced facing relationship with said second electrode, with said protrusions of said additional electrode extending toward said second electrode said protrusions being spaced to be disposed adjacent said non-carbon-bearing portions at said filters when said second electrode and said additional electrode are in said spaced facing relation.

15. The apparatus of claim 14, in which said protrusions on said additional electrode comprise spaced parallel ridges.

16. The apparatus of claim 1, further comprising: a vibrator attached to said apparatus to vibrate the filters when the filters are disposed in said pattern, whereby the carbon in the carbon-bearing portions of the filters is settled by means of the vibrations created by said vibrator.

17. The apparatus of claim 1, in which said capacitance measuring means comprises:
a. an electric circuit connected to said first and second electrodes having means for generating a reference electric current in said electric circuit, the magnitude of said reference current being a substantially linear function of the magnitude of the capacitance between said first and second electrodes over a range of magnitude of said capacitance; and
b. means to measure the magnitude of said reference current.

18. The apparatus of claim 17, in which said electric circuit comprises:
a. a transistor oscillator having a tuned base circuit and a tuned collector circuit connected thereto, said first and second electrodes being connected as a capacitor in said tuned base circuit, said reference current being the collector current of said transistor.

19. The apparatus of claim 18, wherein:

a. said tuned collector circuit comprises a first inductive element and a capacitive element connected therein in parallel; and
b. said tuned base circuit comprises a second inductive element connected in said base circuit in parallel with said first and second electrodes.

20. The apparatus of claim 19, in which said means for measuring said reference current comprises:

a Wheatstone bridge circuit into an arm of which the portion of said tuned collector circuit comprising said first inductive element and said capacitive element is connected, to measure and indicate variations in said reference current across said first inductive element and said capacitive element.

21. An apparatus to measure the relative quantity of carbon present in smoke filter rods, the filter rods including carbon-bearing regions and non-carbon-bearing regions, each carbon-bearing region thereof including a chamber partially filled with carbon granules, said apparatus comprising:

a. a parallel plate capacitor comprising a first conductive plate and a second conductive plate, said first conductive plate having spaced conductive ridges disposed on one side thereof, said first conductive plate being disposable in a position in which said spaced conductive ridges face said second conductive plate;
b. means adapted to receive rods of filter material between said first and second conductive plates, and to maintain the rods in a parallel relationship, said means comprising a first side wall attached to said second conductive plate, a second side wall attached to said second conductive plate, parallel to said first side wall at a distance from said first side wall greater than the length of the rods of filter material to be tested, and at least one end wall disposed between said first and second side walls forming with said first and second side walls and said second conductive plate a frame to maintain rods of filter material to be tested parallel to and between said first and second conductive plates;
c. a vibrator adapted to vibrate said rods of filter material to effectuate a relatively consistent array of the carbon granules within the chambers from one measurement to another;
d. a third conductive plate having spaced ridges disposed on one side thereof, said third conductive plate being disposable in a position having said spaced ridges facing said second conductive plate, said spaced ridges comprising electrically conductive material and being spaced to dispose said ridges adjacent said non-carbon-bearing regions of the rods of filter material to be tested;
e. a capacitance measuring and indicating device electrically connected to said parallel plate capacitor and said third conductive plate having means adapted to measure change in capacitance of said parallel plate capacitor when the rods of filter material to be tested are disposed therein and to indicate the carbon content of the rods; and
f. a power source electrically connected to one of said first and second conductive plates adapted to apply electric potential difference between said first and second conductive plates.

22. An apparatus for measuring the relative quantity of carbon present in smoke filter rods, the filter rods having carbon-bearing regions each including a chamber partially filled with carbon granules, and non-carbon-bearing regions, said apparatus comprising a. a frame;
b. a first electrically conductive capacitor plate rigidly fixed to said frame;
c. a second electrically conductive capacitor plate rotatably mounted to said frame and adapted to be rotated into a spaced substantially parallel facing relation with said first conductive plate, said second conductive plate comprising spaced ridges disposed on its side adjacent said first conductive plate, said spaced ridges comprising electrically conductive material and being spaced to dispose said ridges adjacent said carbon-bearing regions of the filter rods when said second conductive plate is disposed in its spaced substantially parallel relation with said first conductive plate;
d. means disposed between said first and second conductive plates to receive the filter rods to be tested and to maintain the rods parallel to and between said first and second conductive plates when said first conductive plate is disposed in its spaced parallel facing relation with said second conductive plate;
e. spacer means disposed between said first and second conductive plates to maintain said first conductive plate parallel to said second conductive plate;
f. a vibrator attached to said frame to vibrate the filter rods to effectuate a relatively consistent array of carbon granules within the chambers of the filter rods from one measurement to another;
g. a third electrically conductive plate rotatably mounted to said frame to be rotatable into a spaced parallel facing relationship with said first conductive plate, said third conductive plate having spaced ridges disposed on its side adjacent said second conductive plate, said spaced ridges comprising electrically conductive material and being spaced to dispose said ridges adjacent said non-carbon-bearing regions of the rods of filter material when said third conductive plate is in its said spaced parallel facing relationship with said first conductive plate;
h. a capacitance measuring and indicating means electrically connectable to said first, second and third conductive plates having means adapted to measure the change in capacitance between one of said first and second conductive plates and said first and third conductive plates, when the rods of filter material to be tested are disposed therebetween and to indicate the carbon content of the rods; and
i. a power source electrically connected to the said capacitance measuring and indicating means to electrically activate said measuring and indicating means.

23. A method of measuring the quantity of carbon present in smoke filters having carbon-bearing regions, and non-carbon-bearing regions, said method comprising the steps of:

a. placing the filters between the electrodes of a capacitor;

b. applying electric potential difference between said electrodes to selectively generate an electric field in the said carbon-bearing regions substantially stronger than the electric field in the said non-carbon-bearing regions;

c. measuring the capacitance of said capacitor with the filters inserted therebetween; and d. comparing the measured capacitance with the capacitance of the capacitor when smoke filters having a predetermined quantity of carbon are present in said capacitor.

24. The method of claim 23 wherein the step of measuring capacitance comprises the steps of:

a. connecting said capacitor in parallel with an inductive element into the tuned base circuit of a tuned collector, tuned base transistor oscillator which produces a reference collector current on actuation which is substantially proportional to the value of the capacitance of said capacitor;

b. actuating said oscillator to produce said reference current;

c. measuring said reference current; and d. comparing said reference current to that generated when filters with known carbon content are placed between the electrodes of said capacitor.

25. The method of claim 23, comprising the further subsequent steps of:

a. applying an electric potential to said capacitor to selectively generate an electric field in said non-carbon-bearing regions which is substantially stronger than the electric field in said carbon-bearing regions, and then b. measuring the capacitance of said capacitor.

26. An apparatus for measuring the relative amount of carbon in smoke filters comprising:

a. a parallel plate capacitor having said plates positioned in a substantially facing relation and spaced to accomodate placement of the filters therebetween; and b. means for measuring the capacitance of said parallel plate capacitor by generating a reference current which varies in proportion to the value of said capacitance, over a range of values of said capacitance, said measuring means including i. a transistor oscillator having a tuned collector circuit having a first inductive element and a capacitive element connected therein in parallel, and a tuned base circuit having a second inductive element connected therein in parallel with said parallel plate capacitor; said collector and base circuits being inductively coupled between said first and second inductive elements, said reference current being the current in said tuned collector circuit, ii. means for actuating said transistor oscillator, and iii. means for measuring said reference current.

27. The apparatus of claim 26, in which said means for measuring said reference current comprises:

a Wheatstone bridge circuit into an arm of which the portion of said tuned collector circuit comprising said first inductive element and said capacitive element is connected, to measure and indicate variations in said reference current across said first inductive element and said capacitive element.

* * * * *

UNITED STATES PATENT OFFICE
CERTIFICATE OF CORRECTION

Patent No. 3,696,299   Dated October 3, 1972
   (Ser. No. 8,603)   Filed (February 4, 1970)
Inventor(s) James O. Pullman and William R. Weidlich
   (RELATIVE CARBON CONTENT METER FOR SMOKE FILTERS)

It is certified that error appears in the above-identified patent and that said Letters Patent are hereby corrected as shown below:

Correct number of reference Patent No. 2,739,284.

Signed and sealed this 10th day of April 1973.

(SEAL)
Attest:

EDWARD M. FLETCHER, JR.   ROBERT GOTTSCHALK
Attesting Officer   Commissioner of Patents